United States Patent [19]

Julien

[11] Patent Number: 5,020,915
[45] Date of Patent: Jun. 4, 1991

[54] EXTRUSION SCREW FOR THERMOPLASTIC MATTER

[75] Inventor: Philippe Julien, Brussels, Belgium

[73] Assignee: Advanced Recycling Technology Ltd., Lausanne, Switzerland

[21] Appl. No.: 358,380

[22] PCT Filed: Sep. 14, 1988

[86] PCT No.: PCT/BE88/00024

§ 371 Date: May 11, 1989

§ 102(e) Date: May 11, 1989

[87] PCT Pub. No.: WO89/02359

PCT Pub. Date: Mar. 23, 1989

[30] Foreign Application Priority Data

Sep. 16, 1987 [BE] Belgium ............................... 8701043

[51] Int. Cl.$^5$ ............................................ B29C 47/60
[52] U.S. Cl. ............................. 366/89; 366/79; 366/323; 425/208
[58] Field of Search ................. 366/69, 79, 83, 88, 366/89, 318, 323, 319; 425/207–209

[56] References Cited

U.S. PATENT DOCUMENTS

| | | | |
|---|---|---|---|
| 3,701,512 | 10/1972 | Schippers et al. | 366/89 |
| 3,897,937 | 8/1975 | Limbach | 366/79 |
| 4,215,978 | 8/1980 | Takayama et al. | 366/89 |
| 4,321,229 | 3/1982 | Blakeslee, III et al. | 425/208 |
| 4,387,997 | 6/1983 | Klein et al. | 366/318 |
| 4,425,044 | 1/1984 | Kurtz et al. | 366/79 |
| 4,733,970 | 3/1988 | Yokana | 425/208 |
| 4,798,473 | 1/1989 | Rauwendaal | 366/89 |
| 4,875,847 | 10/1989 | Wenger et al. | 366/88 |

Primary Examiner—Timothy F. Simone
Attorney, Agent, or Firm—Zarley, McKee, Thomte, Voorhees & Sease

[57] ABSTRACT

The extrusion screw for thermoplastic material comprises a helical thread, having a trapezoidal profile with a flat crest and inclined flanks, the pitch and the width or the root of which remains constant, while the inside diameter of the screw increases from the entry of the screw in the direction of the exit.

5 Claims, 2 Drawing Sheets

EXTRUSION SCREW FOR THERMOPLASTIC MATTER

BACKGROUND OF THE INVENTION

The present invention relates to an extrusion screw for thermoplastic matter. An extrusion screw for plastic matter is generally based on the principle of the Archimedes' screw. It comprises, in the classical and known concept, the following characteristics, given in order to improve understanding and for a more concise presentation in FIGS. 1 and 3.

In FIG. 1, the following classical characteristics are illustrated:

the angle of inclination or the helical angle of the thread, represented as $\alpha$ the pitch AB of the thread, it is also equal to tangent $\alpha$ the outside diameter CD of the screw, the inside diameter or the diameter of the core, designated EF or GH, the head T of the thread the whorl MO the width of the thread or width L of the whorl the effective area of the screw is given by the area PQRX.

In FIG. 2, the following classical characteristics are illustrated:

V the empty space or cavity of the thread;
T the head of the thread
PQRX the effective area of the screw
S the width of the crest of the thread
QR the width of the root of the thread
$\gamma$ the angle formed by the flank of the thread and the longitudinal axis of the screw, in upstream direction
$\delta$ the angle formed by the flank of the thread and the longitudinal axis of the screw, in downstream direction.

The length of a classical extrusion screw depends on the material to be transformed and on the shape of the profile to be obtained by extrusion. Typically, it varies from 12 to 53 times the outside diameter CD.

The aim of an extruder screw is threefold, being:

to transport the plastic matter from a supply hopper where it is introduced, to a die where the matter assumes the profile given by the latter.

to bring about homogeneity by friction against the cylinder of the body of the extruder at the same time as its fluidification, by elevation of the temperature, to compress all the matter.

To this end, a classical screw comprises at least three different zones, distinguished by a thread profile optimized so as to meet each of these requirements. Usually, the first section of the screw (first ⅓) is designed to advance the material without perceptible modification of the physical characteristics.

The central section (second ⅓) is designed to initiate the changing of the physical state by heating, i.e. the transition from the solid state to the molten state, of the thermoplastic matter.

The mechanism of the melting of thermoplastic matter in an extruder is complicated, and the melting is far from homogeneous.

The third section of the screw (third ⅓) is designed so as to accentuate the pressure, either by a reduction of the depth of the threads or by an increase in the pitch of the thread. That portion of the mixture which is still solid is broken up into small particles which intermix with the already molten phase at the same time as the fluid mixture is subjected to pressure which is ensured to raise it to the desired rate of compression.

The quotient of the effective area PQRX at the entry of the screw to the effective area at the exit is called the "rate of compression". It is obvious that a far higher rate of compression is required if a material in powder form is transformed than if the material is in granular form since, at a constant mass, there will, in the first case, be a far more substantial volume, owing to a lower volumetric mass (or apparent density). It is useless to attempt to increase the rate of compression by increasing the speed of rotation of the screw. This frequently corresponds only to an additional energy consumption, which may lead to an upset in the various temperatures of the extruder, as a result of overheating due to the too intense mechanical working.

In the prior art, the rate of compression and the length of the screw are not always adequate to ensure the good homogeneity of the material. Frequently other modifications in the concept of screws have been effected, for example, the addition of mixer fingers to one or more screw threads, or the use of a curve in one or more threads, or the use of a multiple of engaging screws, or even providing the screws with a variety of different successive components. All these modifications and additional devices are costly, cumbersome and easily damaged.

SUMMARY OF THE INVENTION

The present invention has the aim of overcoming the aforementioned disadvantages. The design and the concept of a single screw is still maintained but, instead of increasing the rate of compression by increasing the diameter of the core or by decreasing the pitch of the thread, as is being done in the prior art, the width of the root of the thread QR is maintained, at the same time as the constant pitch, while the inside diameter of the core increases. As a result, the width of the crest of the thread increases progressively as the inside diameter or core diameter GH or EF, respectively, is increased.

BRIEF DESCRIPTION OF THE DRAWINGS

An exemplified embodiment of an extrusion screw according to the invention is illustrated hereinafter with reference to the drawings, in which:

FIG. 4 is a longitudinal section of the screw, comparable to FIG. 1, and

DESCRIPTION OF THE PREFERRED EMBODIMENT

In FIG. 4, it can be seen that, from one end to the other of the length illustrated (and it is the same along the entire length of the screw) the width F of the root of the thread remains constant, at the same time as the pitch AB of the thread. In contrast, however, the width S of the crest of the thread increases in the direction of the head of the extruder (downstream direction).

Figure 1:
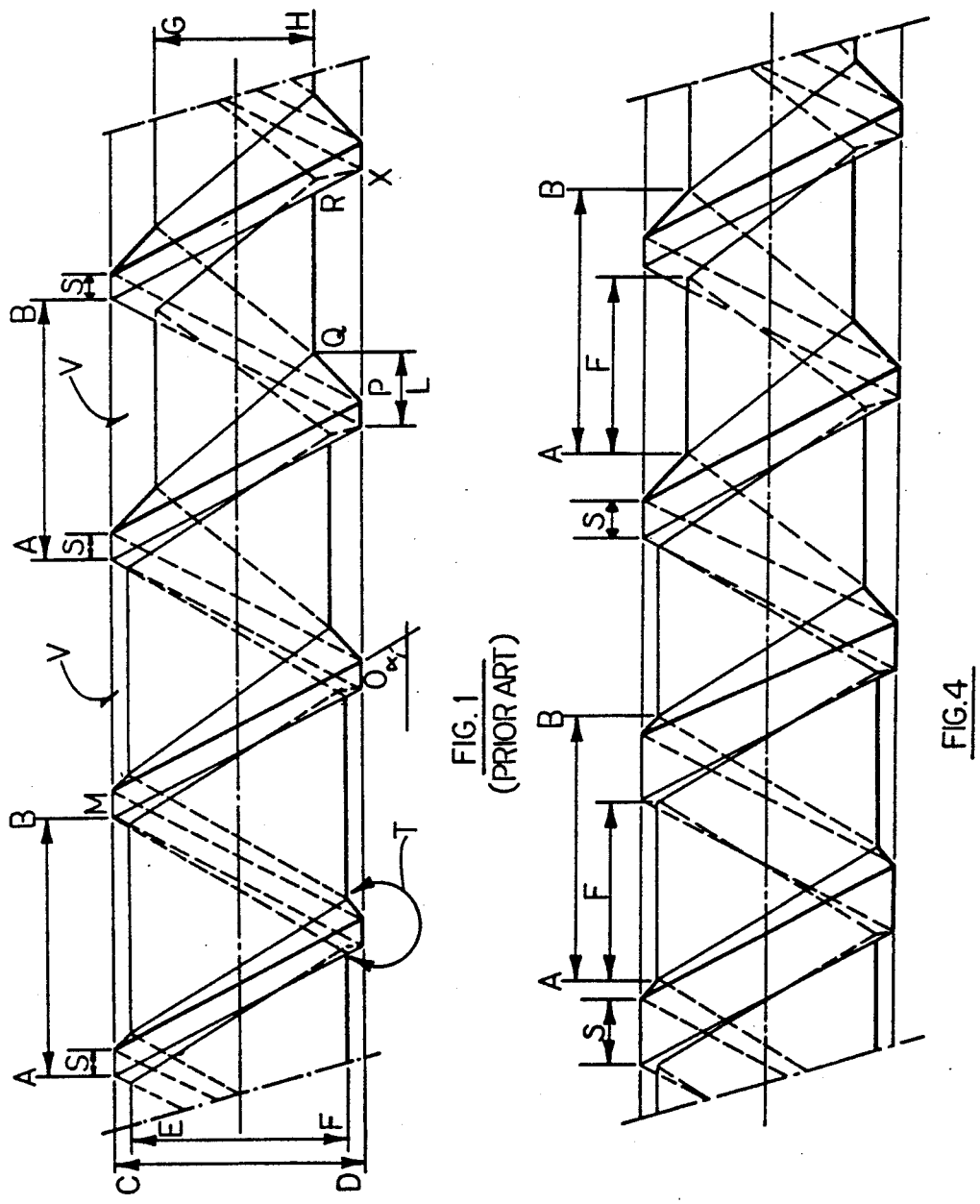
FIG. 1 diagrammatically shows a longitudinal section of part of the screw.
Figure 2:
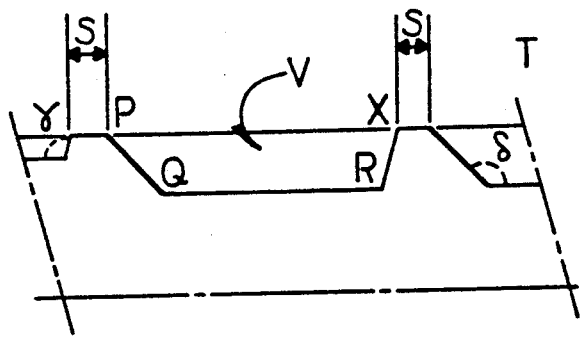
FIG. 2 shows, by way of example, a partial longitudinal section through the profile of two consecutive whorls.

In comparison with FIG. 1, illustrating the prior art, it is noted that in the two cases, the pitch remains constant but that, in the prior art, it is the width S of the crest of the thread which is also constant while the width F of the root of the thread varies by increasing downstream.

Figure 3:
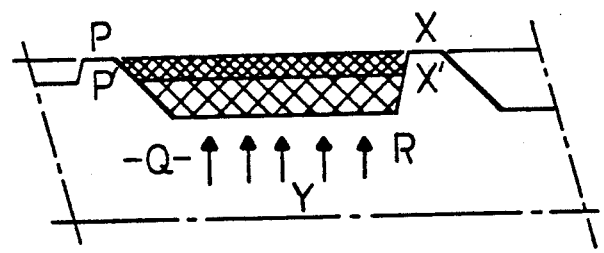
FIG. 3 shows the same section as in FIG. 2, except it shows the behavior of the compression exerted on the plastic matter during extrusion.
Figure 5:
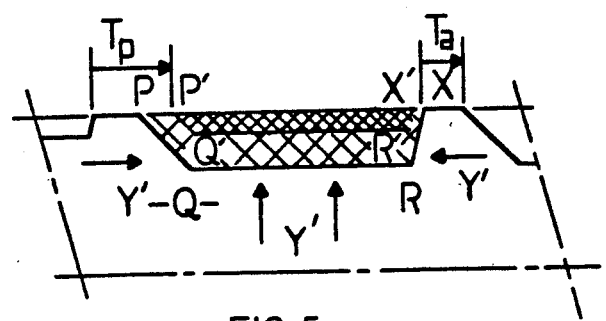
FIG. 5 is a partial longitudinal section at the level of the two successive whorls, comparable to FIG. 3.

The effects of compression exercised by these two techniques are apparent when comparing FIGS. 3 and 5 where the surfaces, in large cross-hatching, represent the reduction of the effective volume and, therefore, also the reduction of the effective area, thus giving an indication of the compression exercised, at the transition from a section of a given core diameter to a section where the diameter of the core is larger. The small cross-hatching, in each case, represents that which remains of the effective volume.

It is noted in the embodiment according to the prior art as per FIG. 3, that the compression of the channel formed by the root QR of the thread and the sloping flanks of the thread PQ and RX, respectively, takes place virtually exclusively in radial fashion, in the direction indicated by the arrows Y, the original effective area of the thread represented by the area PQRX having been reduced after a rotation of the screw to that described as PP'X'X. The width P'X' is distinctly greater than that of QR, the width of the root of the thread.

In contrast, in the case of a screw according to the invention, an analogous partial cross-section of which is illustrated in FIG. 5, it is noted that, after a revolution of the screw, the reduction of the original effective area is in the radial direction at the same time as in the axial direction, as illustrated by the arrows Y', the initial area PQRX having been reduced to that described by P'Q'R'X'. The width Q'R' is completely identical to the width QR of the root of the thread.

This compression of the matter effected according to the invention in the radial and axial directions results in a far more equal distribution of the frictional forces between the cylinder of the extruder and the screw. As a result, a more regular heating of the thermoplastic matter takes place without any localized overheating which may lead to damage of the transformed matter. This feature is even more important in the case of mixtures of diverse material or for very sensitive polymer compositions.

The fact that the width of the crests of the thread increases gradually as the dimension of the core increase, has two other additional advantages: firstly, the increased area of the crests of the thread provides a greater resistance to the reflux of matter between two successive whorls, a fact which distinctly increases the effectiveness of the extrusion screw, and, secondly, the friction surface between the screw and the casing of the cylinder of the extruder being greater at the bottom of the screw, the zone of maximum solicitation, brings about an increased life of the screw, the wear being distributed over a larger surface area.

What is claimed is:

1. An extrusion screw for thermoplastic matter having opposite first and second ends, a core with an inside diameter, and a helical thread having a root, a flat crest and inclined flanks, characterized in that the pitch and the width of the root of the thread are constant, while the inside diameter of the core increases from the first end toward the second end of the screw and in that the width of the crest of the thread increases as the diameter of the core increases.

2. An extrusion screw according to claim 1, characterized in that the screw includes a transition zone wherein the constant pitch and increasing diameter of the root are located.

3. Extrusion screw according to any of claim 1 and 2, characterized in that the root of the thread is flat.

4. An extrusion screw according to claim 1 characterized in that the screw has a root land which is constant.

5. An extrusion screw according to claim 1 characterized in that the root is cylindrical.

* * * * *